Patented Nov. 16, 1937

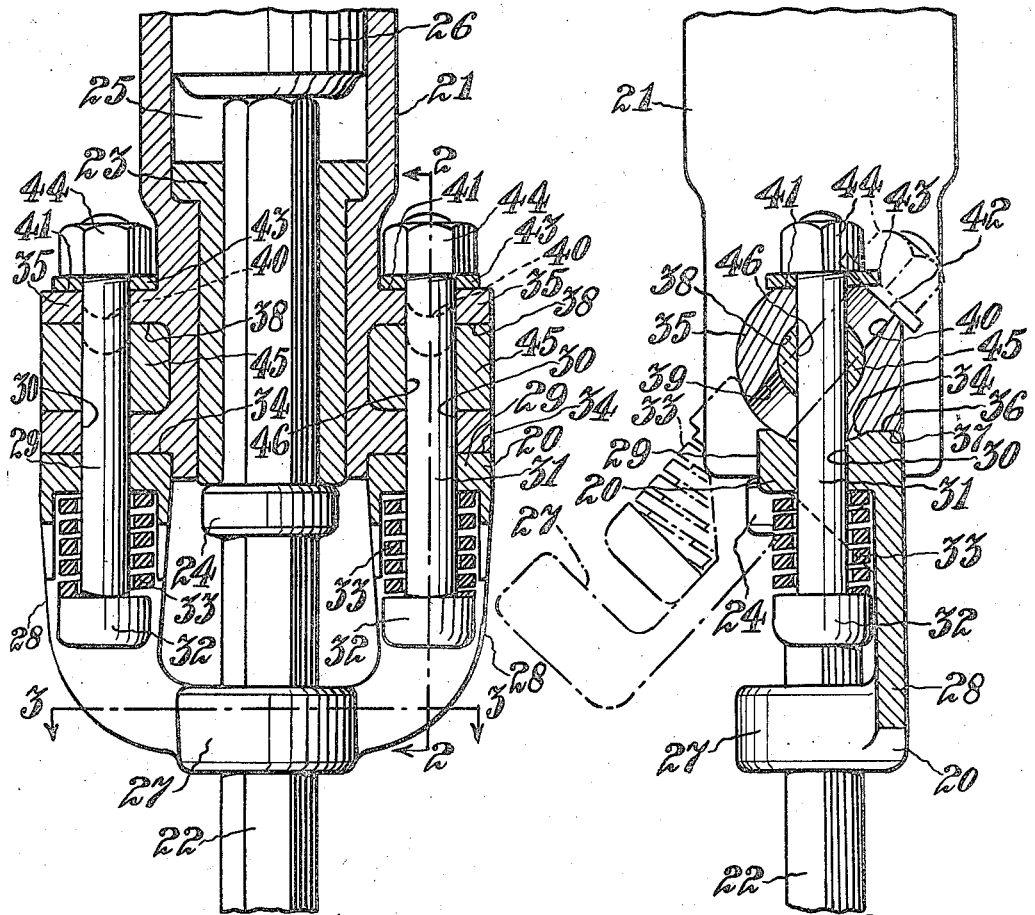

2,099,333

UNITED STATES PATENT OFFICE 2,099,333

IMPLEMENT RETAINER

George H. Fuehrer, Phillipsburg, N. J., assignor to Ingersoll-Rand Company, Jersey City, N. J., a corporation of New Jersey Application June 26, 1937, Serial No. 150,519

2 Claims. (Cl. 121—32)

This invention relates to rock drills, and more particularly to an implement retainer for rock drills of the type in which the working implement and the percussive element actuating it are capable of relative reciprocatory movement.

It is an object of this invention to provide a simple and efficient device to retain the working implement in the rock drill and one that may be cheaply manufactured and readily attached to and removed from the drill.

Other objects will be in part obvious and in part pointed out hereinafter.

In the drawing accompanying this specification and in which similar reference numerals refer to similar parts, Figure 1 is an elevation, partly broken away, of an implement retainer constructed in accordance with the practice of the invention and a rock drill to which it is applied, Figure 2 is a side elevation, partly broken away, taken through Figure 1 on the line 2—2, and Figure 3 is a transverse view taken through Figure 1 on the line 3—3.

Referring more particularly to the drawing, the implement retainer, designated in its entirety by 20, is shown applied to the front end of a casing 21 of a rock drill adapted to actuate a working implement 22 which extends into and is guided by a bushing 23 arranged in the front end of the casing 21.

The working implement 22 has a collar 24 which seats against the front end of the bushing 23 to limit the distance which the working implement may extend into the rock drill. The rear or shank end of the working implement extends rearwardly of the bushing 23 and into a cavity 25 in the casing to receive the blows of a hammer piston 26 reciprocable in the casing 21.

The implement retainer 20, constructed in accordance with the practice of the invention, comprises a yoke 27 shaped to partly encircle the working implement 22 about which it is disposed, in the retaining position, forwardly of the collar 24. The yoke 27 has integral side arms 28 which carry at their rearward ends flanges 29 having apertures 30 to accommodate bolts 31 upon which the yoke is slidably mounted. The head portions 32 of the bolts serve as seats for springs 33 arranged about the bolts and acting with their other ends against the forward surfaces of the flanges 29.

In the rearmost extremities of the flanges 29 are concave surfaces 34 to bear against and correspond with the curvature of the periphery of trunnions 35 arranged on opposite sides of the casing 21 and extending laterally thereof. Adjacent the concave surfaces 34 and on the same ends of the flanges 29 as the concave surfaces are flat surfaces 36 which seat against similar surfaces 37 on the trunnions 35 to prevent movement of the yoke 27 beyond the correct retaining position.

The trunnions 35 are hollow having bores 38 which open from the free ends of the trunnions, and in the walls of the trunnions are diametrically opposed elongated apertures 39 and 40 to receive the bolts 31. The apertures extend from the bores 38 to the peripheries of the trunnions. They taper outwardly and adjacent their outer ends are seating surfaces 41 and 42 which are angularly disposed with respect to each other and form seats for washers 43 which are held against the seating surfaces by nuts 44 threaded on the bolts 31.

The seating surfaces 41 and 42 lie normal to the portions of the apertures 40 which they encircle so that in one position of the bolts 31 the washers 43 will seat upon the surface 41 and in another limiting position upon the surface 42 to hold the yoke against unauthorized movement with respect to the working implement 22.

In order to assure oscillatory movement of the bolts 31 in equal degree and thereby preclude distortion of the yoke, bearings 45 in the form of plugs are disposed rotatably in the bores 38 and have apertures 46 to receive the bolts 41. The bearings 45 are freely rotatable in the bores and serve to maintain the axes of the bolts in the planes of the axes of the bores. Thus, when the yoke 27 is rocked relatively to the trunnions the bolts will be retained in the same plane and the chances of one side arm 28 being drawn out of the plane of the other and a consequent distortion of the yoke will, therefore, be obviated.

In assembling the retainer on the rock drill the bearings 45 are placed in the bores 38 and after the springs have been assembled on the bolts 31 the latter are inserted in the apertures 30 of the flanges 29 and thereafter in the apertures 30, 46 and 40. After the washers 43 have been placed on the bolts the nuts 44 are threaded in position to partly compress the springs 33 which, by acting against the heads 32 and the flanges 29, press the concave surfaces 34 into firm frictional engagement with the peripheries of the trunnions 35.

The pressure of the springs 33 may be conveniently adjusted in accordance with requirements by the nuts 44 but should be of such value that the retainer will be held firmly in its limiting positions unaffected by the vibration incident to the operation of the rock drill.

In the normal or retaining position of the retainer the yoke 27 encircles the working implement forwardly of the collar 24 so that whenever the working implement is projected sharply forwardly or during the withdrawal of the working implement from a drill hole the yoke engages the collar and thus assures the retention of the shank end of the working implement in the rock drill. Whenever it is desired to change working implements the yoke is rocked from the retaining position in which the washer 43 seats upon the surface 41 to one in which the washer 43 seats against the surface 42 and where it will be securely held by the pressure of the spring 33. After the exchange of working implements has been effected the yoke is again returned to its original position to act as an abutment for the collar 24.

During the swinging or shifting of the yoke from one limiting position to the other the bolts 31 will be caused to move in equal degree by the bearings 45 as will also the side arms 28. As a result, the yoke will remain in true parallelism with the collar 24 so that when the working implement is projected forwardly a wide area of the collar will contact with the yoke, thereby obviating the changes of point contact and localized strain on the yoke.

I claim:

1. In an implement retainer for percussive tools, the combination of a casing and a working implement in the casing, a retainer for retaining the working implement in the casing, hollow trunnions on the casing having diametrically opposed elongated apertures therein, bolts for clamping the retainer against the trunnions and being swingable in the apertures, and means rotatable in the trunnions forming bearings for the bolts.

2. In an implement retainer for percussive tools, the combination of a casing and a working implement in the casing, a retainer for retaining the working implement in the casing, hollow trunnions on the casing having diametrically opposed elongated apertures therein, bolts in the apertures extending through the retainer, springs on the bolts to press the retainer against the trunnions, and bearing members for the bolts rotatable in the trunnions.

GEORGE H. FUEHRER.